H. C. MAISE.
AUTOMOBILE BODY.
APPLICATION FILED AUG. 23, 1916.

1,409,962.

Patented Mar. 21, 1922.

Inventor
Herman C. Maise
By his Attorneys

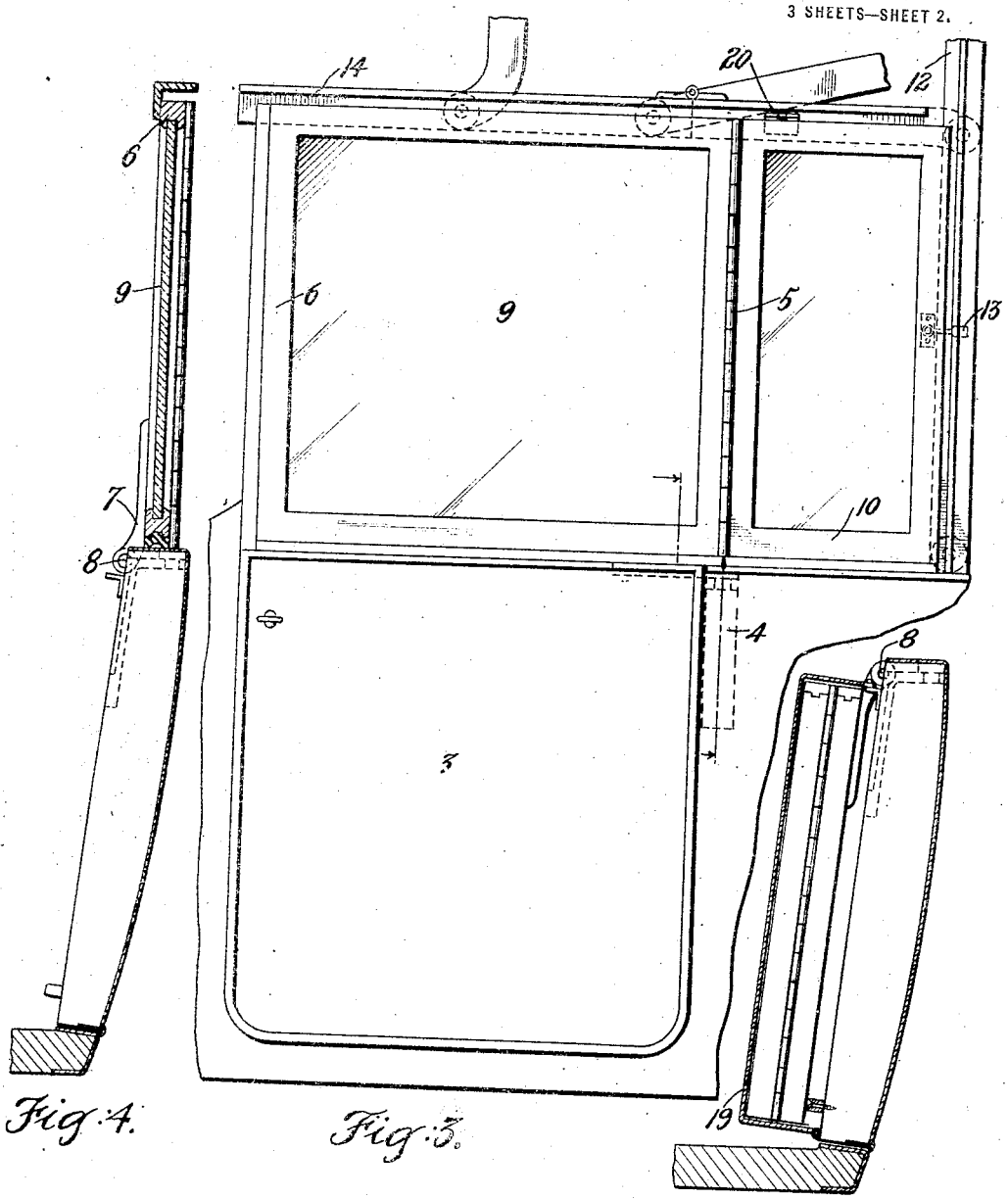

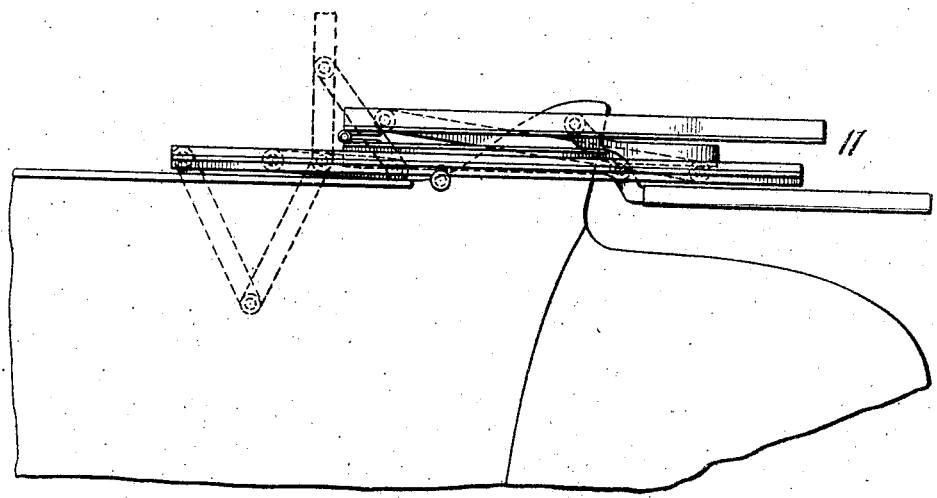
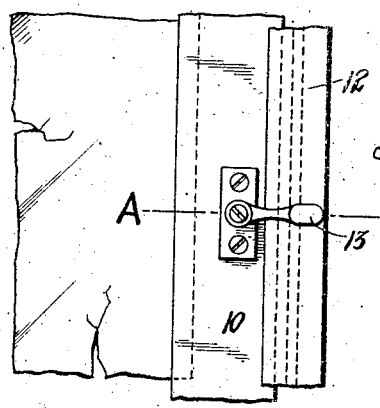
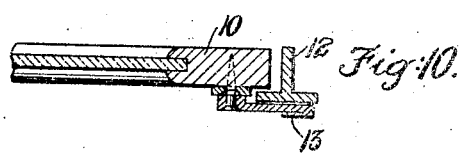

UNITED STATES PATENT OFFICE.

HERMAN C. MAISE, OF SPRINGFIELD, MASSACHUSETTS, ASSIGNOR, BY MESNE ASSIGNMENTS, TO EDWARD G. BUDD MANUFACTURING COMPANY, A CORPORATION OF PENNSYLVANIA.

AUTOMOBILE BODY.

1,409,962.

Specification of Letters Patent. Patented Mar. 21, 1922.

Application filed August 23, 1916. Serial No. 116,417.

*To all whom it may concern:*

Be it known that I, HERMAN C. MAISE, a citizen of the United States, and a resident of Springfield, county of Hampden, and State of Massachusetts, have invented certain new and useful Improvements in Automobile Bodies, of which the following is a description.

My invention relates to the now well known Springfield type of automobile body, and has for its object to provide a construction whereby the top, windows and side members may be readily lowered into an inoperative position, or whereby the top may be left erected and windows and side members lowered into an inoperative position. The top may be as shown in Letters Patent No. 1,181,689, issued to Hinsdale Smith.

My construction eliminates all detachable or removable windows. All of the windows of my improved body are hingedly connected to the doors of said body.

I provide also, because of my improved construction, a means whereby said conversion from a closed to an open type of vehicle takes place with the least possible inconvenience to the passengers occupying the vehicle at the time of conversion, and also I save for other purposes a space usually provided for the storage of windows and other removable members.

In the accompanying drawings are shown my invention applied to a two passenger, inside drive, cabriolet type of vehicle, but I do not wish to limit myself to this type alone, as my invention may be applied to other types, whether built to accommodate two, four or more passengers and whether using a rigid or foldable top.

For full understanding of my invention, reference is to be had to the following description and accompanying drawings, in which:

Fig. 3 is a side sectional view of a portion of my improved body on an enlarged scale;

Fig. 4 is a sectional view through the door and window of my improved body, the window being in the operative position;

Fig. 5 is a sectional view taken through the door and window, the window being folded into the inoperative position;

Fig. 6 is a sectional view through the window and side member of my improved body, the window and side member being raised into the operative position;

Fig. 7 is a side view of my improved body with the top folded, the top covering being removed;

Fig. 8 is a fragmentary sectional view on an enlarged scale through the door and window;

Fig. 9 is a fragmentary side view of the side member;

Fig. 10 is a sectional view taken on the lines AA of Fig. 9;

Figure 1:
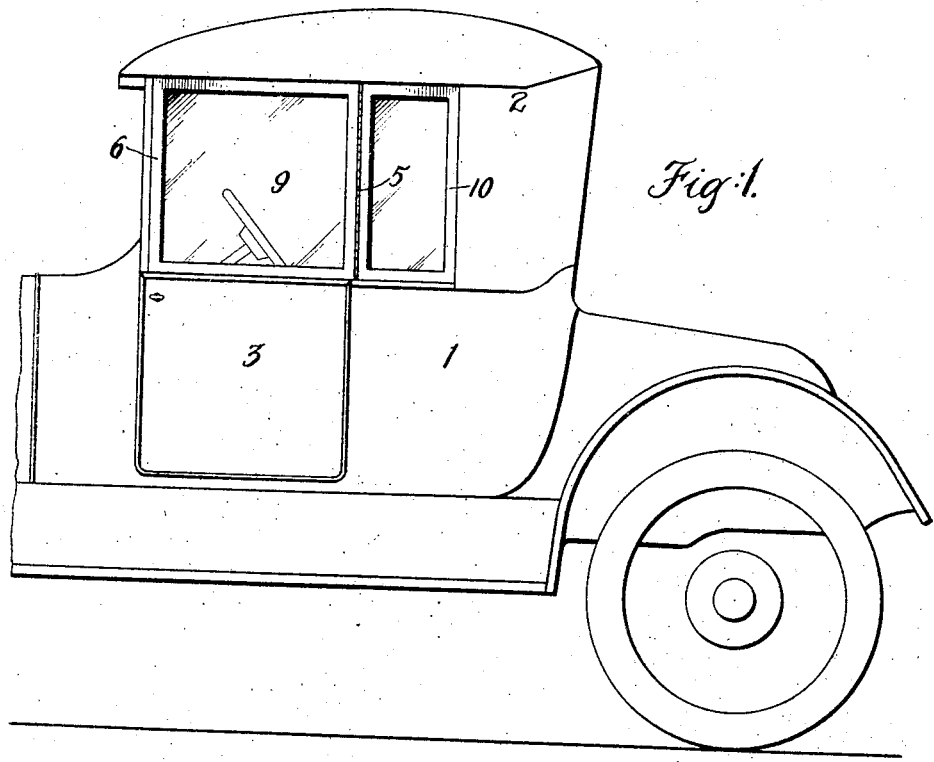
Fig. 1 shows a side view of an automobile body to which my invention has been applied.

Referring to the drawings, 1 illustrates the body of the car upon which is mounted a foldable top 2 of any suitable kind, the top I have illustrated being constructed along the general lines illustrated and described in Letters Patent No. 1,181,689, issued to Hinsdale Smith. It will be understood, however, that my invention, in many of its aspects, is not limited to a foldable top of the kind illustrated and described, or in fact to a foldable top of any description, although in other of its aspects my invention includes the foldable top in combination with other features.

The door 3 is hinged to the body 1 by means of a hinge 4, preferably of the pin type illustrated, in order that alignment may be secured with the hinge 5, which will be hereafter described. It will be understood that my invention is not limited to a construction in which one door only is used, and that it is applicable to types of bodies having more than one door on each side of the vehicle.

Figures 2, 11, 12:
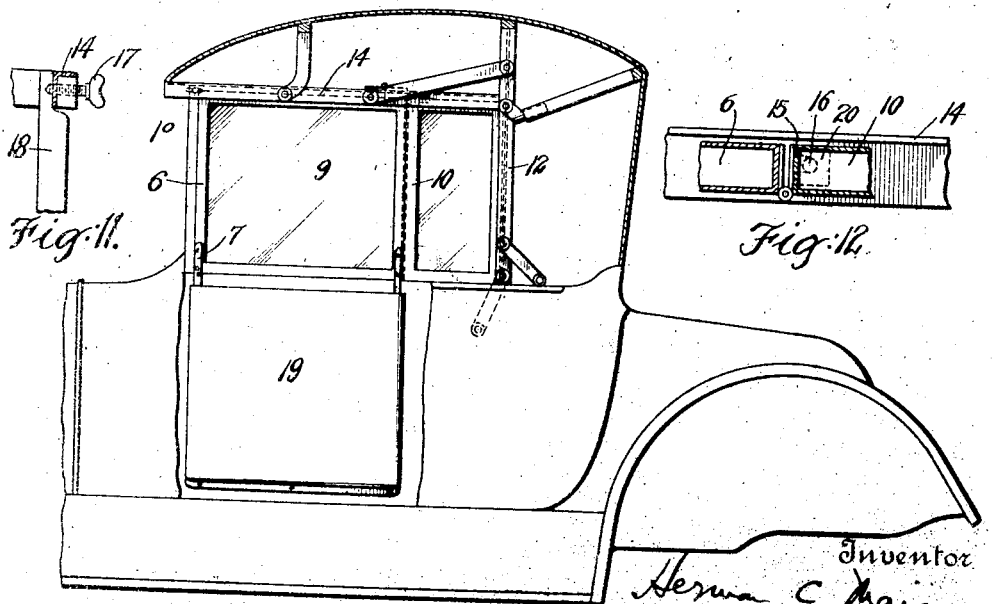
Fig. 2 shows a side view of my improved body, partly in section, to illustrate the position of the top members of bows.
Fig. 11 is a detail view, partly in section, showing the means of attaching the top to the front glazed member.
Fig. 12 is a detail view, partly in section, showing the means for connecting the side member with the upper horizontal top member of bow.

Pivoted at or near the upper edge of the door 3 is a window frame 6, carrying a window 9, the window frame being hinged to the door by means of hinges 7, which are adapted to rotate about a pivot 8 from an operative position, as shown in Figs. 4 and 8, viz., a position above the door, to an inoperative position as shown in Fig. 5, viz., a position alongside of the door and in a plane substantially parallel to it. The hinge 7 may be the hinge ordinarily used in connection with Springfield type bodies, a hinge of this character being illustrated in Patent No. 1,170,569, issued to Hinsdale Smith, or any other suitable hinge may be used. A guard or covering 19 (Figs. 2 and 5) is provided to protect the window when in the inoperative position, the guard being made removable to permit the window being swung to the operative position by hinging the guard at its lower edge, or providing fastenings by which it may be removed altogether.

Connected to a side of the frame 6 is a side member 10, which may be glazed as shown if desired, the connection being preferably made by a hinge 5, such as shown, so as to permit the side member 10 to be swung outwardly against the window frame 6. The hinge 5 is preferably a hinge of the continuous or piano type, in order to secure the best possible alignment of the parts and the most perfect exclusion of the elements. It will be understood, however, that my invention is not necessarily limited to the use of one side member in connection with the window frame, and that if desired a second side member may be hinged or otherwise attached to the forward edge of the window frame 6.

If a foldable top is used, I prefer to use the type illustrated in the drawings, the bows 11 of which are wholly or in part comprised of metallic members having an angular cross section. I prefer to so select the cross section of these bows so that when the top is lowered the bows will nest, and thus occupy a minimum space. When top 2 is erected, the bow 12 assumes a substantially upright or vertical position, and the bow 14 assumes a substantially horizontal position parallel to the top of the door. In these positions the bow 12 will have a flange extending forwardly and another flange extending at right angles thereto, and the bow 14 will have a flange located in a vertical plane and another flange located in a horizontal plane extending upwardly therefrom. These flanges thus act as stops for the window frame and side member 6, the stops being of a depth approximately equal to the thickness of the window frame and side member. They thus act to form a more complete closure. Mounted upon the horizontal flange of bow 14 is a depending pin 16, adapted to fit into a notch 15 formed in a metallic lug 20 attached to the upward forward corner of side member 10. The notch 15 is so formed that it will embrace the depending pin 16 when side member is swung into operative position, and will prevent the upper edge of side member 10 from moving outwardly at its forward edge.

When the top is in the erected position, it is fastened to the wind shield by means of a screw passing through the bow 14 into the vertical member 18, which forms one of the supports of the wind shield.

Attached near the rear inside edge of side member 10 is a latch 13, which is adapted to overlap and engage the vertical bow 12 so as to prevent outward movement of the side member 10. Latch 13, in conjunction with pin 16 and slot 15, effectively holds side member 10 against movement when in the operative position. It will be understood that any other suitable fastening means may be substituted for the latch 16, and means may be provided, if desired, for holding the side member in a partly open position.

The operation of my device is as follows:

Assuming the body to be in a closed condition, as shown in Fig. 1, if it is desired to transform it into an open body the door 3 is opened, the latch 13 is released and side member 10 is swung outwardly against the window frame 6. The guard 19 is then removed and the window frame 6, carrying the side member, is swung downwardly into a position alongside of the door 3 and into a plane substantially parallel to it, as shown in Fig. 5.

If it is desired to lower the top as well, the screw 17 is loosened and the top is folded back.

To close the car once more, the preceding operations are reversed, top is raised to the erected position and fastened in place by means of screw 17. The guard 19 is opened or removed, and frame 6, carrying side member 10, is swung upwardly. Side member 10 is then swung outwardly towards the rear of the body and fastened in place by means of latch 13.

It is obvious that many modifications may be made without departing from the spirit of my invention, and I therefore do not intend to confine myself to the particular forms shown and described.

What I claim is:

1. In a device of the kind described, a door, a window frame pivoted thereon and adapted to be swung from an operative position above the door to an inoperative position alongside the door, a window fixedly mounted in said frame, a side member hingedly connected to said window frame and carried thereby, and adapted to be swung from an operative position in the plane of the window frame to an inoperative position alongside of the window frame, and a guard attached at its lower edge to the inside of the door and adapted to cover the window frame window and side member when in the inoperative position.

2. In a device of the kind described, a body, a foldable top having a pivoted bow adapted to assume a vertical position when the top is erected and having a flange extending in the direction of the length of the body and a flange extending at right angles thereto, and a second pivoted bow adapted to assume a horizontal position when the top is erected and comprising a flange assuming a horizontal position and another flange depending vertically therefrom when the top is erected, a window frame and side member hingedly connected thereto, said window frame being adapted to contact with the vertically depending flange of the horizontal bow and have its upper edge covered by the horizontal flange of the horizontal bow, and said side member being adapted to abut against the forward extending flange of the vertical bow and have its edge covered by the flange of the vertical bow which extends at right angles to the forwardly extending flange.

3. In a device of the kind described, a body, a foldable top having when erected a bow pivotally mounted and adapted to be swung into a vertical position, and comprising a flange extending in the direction of the length of the body and a flange extending at right angles thereto, and a horizontal bow pivotally mounted and having a horizontal flange and a vertically depending flange, a door hingedly connected to the body, a window frame pivoted thereon, a side member hingedly connected to the window frame, said window being adapted to contact with the vertically depending flange of the horizontal bow and be covered by the horizontal flange, and said window being adapted to contact with the flange of the vertical bow which extends in the direction of the length of the body, and be covered by the flange extending at right angles to said last mentioned flange.

4. In a device of the kind described, a body, a door connected thereto by means of a hinge comprising a pin, a window frame pivotally connected to said door and adapted to be swung into an operative position above the door, a window fixedly mounted in said frame a side member connected to said window frame by means of a hinge comprising a pin, the pins of said hinges being in alignment when the window frame is swung into the operative position.

HERMAN C. MAISE.